United States Patent [19]  [11] 4,096,700
Muramatsu et al.  [45] Jun. 27, 1978

[54] OIL BOOM FOR DAMMING AND COLLECTING A FLOATING OIL SLICK

[75] Inventors: Tateo Muramatsu; Toshio Fukai, both of Yokohama; Haruo Takahashi, Kawasaki, all of Japan

[73] Assignee: Bridgestone Tire Co., Ltd., Tokyo, Japan

[21] Appl. No.: 738,977

[22] Filed: Nov. 4, 1976

[30] Foreign Application Priority Data

Nov. 12, 1975 Japan .................. 50-152877
Feb. 20, 1976 Japan .................. 51-18251

[51] Int. Cl.² ........................... E02B 15/04
[52] U.S. Cl. .......................... 61/1 F; 210/242 S
[58] Field of Search .......... 61/1 F; 210/121, 242, 210/DIG. 25

[56] References Cited
U.S. PATENT DOCUMENTS

| Re. 27,640 | 5/1973 | Logan ................................. 61/1 F |
| 3,760,944 | 9/1973 | Bell et al. ........................... 210/110 |
| 3,779,382 | 12/1973 | Steltner ............................... 210/83 |
| 3,883,433 | 5/1975 | March et al. .................. 210/DIG. 25 |
| 3,886,750 | 6/1975 | Ayers et al. ........................ 61/1 F |
| 4,015,431 | 4/1977 | Ahiko ................................. 61/1 F |

Primary Examiner—Jacob Shapiro
Attorney, Agent, or Firm—Sughrue, Rothwell, Mion, Zinn and Macpeak

[57] ABSTRACT

An oil boom is disclosed which comprises two rows of upper and lower stream side; a flexible base sheet connected across base portions of the two rows of floats and hanging down therefrom into the water in a gently curved shape. A plurality of inlet openings are arranged near the upper stream side float and extending in its lengthwise direction; an inflow guide plate made integral with the flexible base sheet and arranged below the inlet openings. A plurality of outlet openings are arranged in a rear portion of the flexible base sheet and extending in its lengthwise direction, the total opening area of the outlet openings per unit length of the flexible base sheet being larger than that of the inlet openings. Thus the oil boom may be utilized not only to dam and collect and oil slick floating on water, but also as an oil collecting region to separate the oil slick from the water.

15 Claims, 10 Drawing Figures

OIL BOOM FOR DAMMING AND COLLECTING A FLOATING OIL SLICK

This invention relates to an oil boom for damming and collecting an oil slick floating on water so as to prevent it from being diffused.

A conventional oil boom comprises two substantially U-shaped fences composed of upper and lower stream side floats and arranged in parallel with each other, a connection band connected to bases of these floats so as to hermetically seal these bases and define an oil collecting region, an oil inlet opening provided at the upper stream side of the oil collecting region and a water outlet opening provided at the lower stream side of the oil collecting region, the water outlet opening being made smaller than the oil inlet opening.

Such a conventional oil boom has the disadvantage that when the oil boom is used under such conditions that a tide current flow runs at a speed of the order of 1 to 2 knots or at a relative speed of the order of 1 to 2 knots which is produced when the oil boom is towed by a boat, the oil slick collected in the oil collecting region becomes disturbed thus remarkably reducing the rate of collecting the oil slick into the oil collecting region.

An object of the invention, therefore, is to provide an oil boom which can obviate the above mentioned disadvantage of the conventional oil boom and can positively dam and collect the oil slick.

A feature of the invention is the provision of an oil boom for damming and collecting a floating oil slick comprising two rows of upper and lower stream side floats spaced apart from each other and partly submerged in water, a flexible base sheet connected across base portions of the two rows of floats and hanging down therefrom below into the water in a gently curved shape, a plurality of inlet openings arranged near the upper stream side float and extending in its lengthwise direction, an inflow guide plate made integral with the flexible base sheet and arranged below the inlet openings, the inflow guide plate projecting toward the upper stream side in a direction in parallel with the water surface, and a plurality of outlet openings arranged in a rear portion of the flexible base sheet and extending in its lengthwise direction, the total opening area of the outlet openings per unit length of the flexible base sheet being larger than that of the inlet openings.

The invention will now be described in greater detail with reference to the accompanying drawings, wherein.

Figure 1:
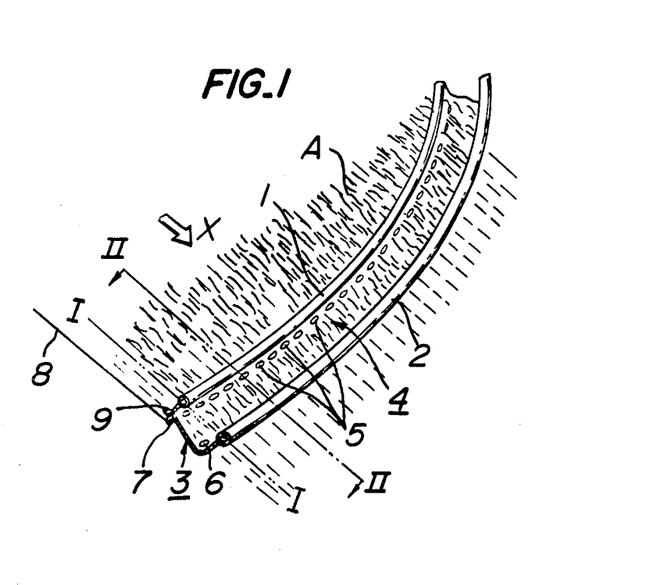
FIG. 1 is a plan view of one embodiment of the oil boom according to the invention, partly in section along a line I—I.
Figure 2:
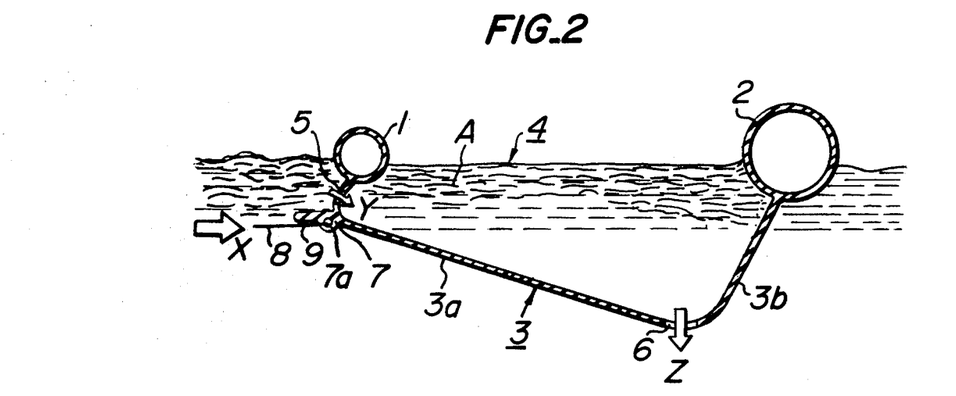
FIG. 2 is a cross-sectional view taken on line II—II of FIG. 1 in an enlarged scale.

In FIGS. 1 and 2 is shown one embodiment of the oil boom according to the invention comprising two rows of upper and lower stream side floats 1, 2 spaced apart from each other and partly submerged in a water surface.

In the present embodiment, each the upper and lower side floats 1, 2 is formed of a flexible annular tubing made of flexible material such as a rubber hose, etc.

The term "upper stream side" shall be understood to mean that side of a tide current flow shown by an arrow X or a relative flow produced when the oil boom is towed by a boat which is faced toward the upper side of the tide flow and a diffused floating oil slick A, while the term "lower stream side" shall be understood to mean that side of the oil boom which is located in the rear of the upper stream side with respect to the direction X of the tide current flow or the relative speed.

Reference numeral 3 designates a flexible base sheet connected across base portions of the two rows of floats 1, 2 and hanging down therefrom below into the water in a gently curved shape. The flexible base sheet 3 is composed of a water impermeable sheet such as a rubberized canvas reinforced by textile cords, a synthetic resin canvas, etc. The flexible base sheet 3 is so connected at its upper peripheral edge to the upper and lower stream side floats 1, 2 as to entirely close base portions thereof and form an oil collecting region 4. The flexible base sheet 3 is provided at that portion thereof which is directly below the upper stream side float 1 with a plurality of inlet openings 5 which extend in the lengthwise direction of the upper stream side float 1 and through which sea water containing a floating oil slick A is passed into the oil collecting region 4. The flexible base sheet 3 is provided at its rear portion with a plurality of outlet openings 6 which extend in the lengthwise direction of the lower stream side float 2 and through which sea water only is discharged out of the oil collecting region 4. The total opening area of the outlet openings 6 per unit length of the flexible base sheet 3 is made larger than that of the inlet openings 5.

As clearly shown in FIG. 2, the inlet openings 5 are arranged at that portion 3a of the flexible base sheet 3 which is located at the upper stream side from the intermediate position between the upper and lower stream side floats 1, 2. The outlet openings 6 may preferably be arranged at that portion 3b of the flexible base sheet 3 which is located at the lower stream side from the intermediate position between the upper and lower stream side floats 1, 2.

As described above, the total opening area of the outlet openings 6 per unit length of the flexible base sheet 3 is made larger than that of the inlet openings 5, but it is preferable to select a ratio of the total opening area of the outlet openings 6 per unit length of the flexible base sheet 3 to that of the inlet opening 5 to the order of about 2.

When the oil boom constructed as above described is used under such conditions that the flow of tide current runs at a relatively high speed on the order of 1 to 2 knots or at a relative speed of the order of 1 to 2 knots which is produced when the oil boom is in tow by a boat, sea water containing a floating oil slick A flows through the inlet openings 5 into the oil collecting region 4 to produce a water pressure which is then subjected to the inside surface of the flexible base sheet 3. This water pressure subjected to the inside surface of the flexible base sheet 3 exceeds that water pressure subjected to the exterior surface of the flexible base sheet 3 which is reduced due to the sea water discharged through the outlet openings 6, so that the flexible base sheet 3 is deformed into a gently curved shape as shown in FIG. 2.

In order to deform the flexible base sheet 3 into the above described shape, the flexible base sheet 3 is provided at that position thereof which is located below the upper stream side float 1 with a depending tension supporting member 7. The depending supporting member 7 may preferably be made of material having a relatively small elongation.

In the present embodiment, the tension supporting member 7 is connected to a rope or cable 8 to be towed by a boat.

Figure 3:
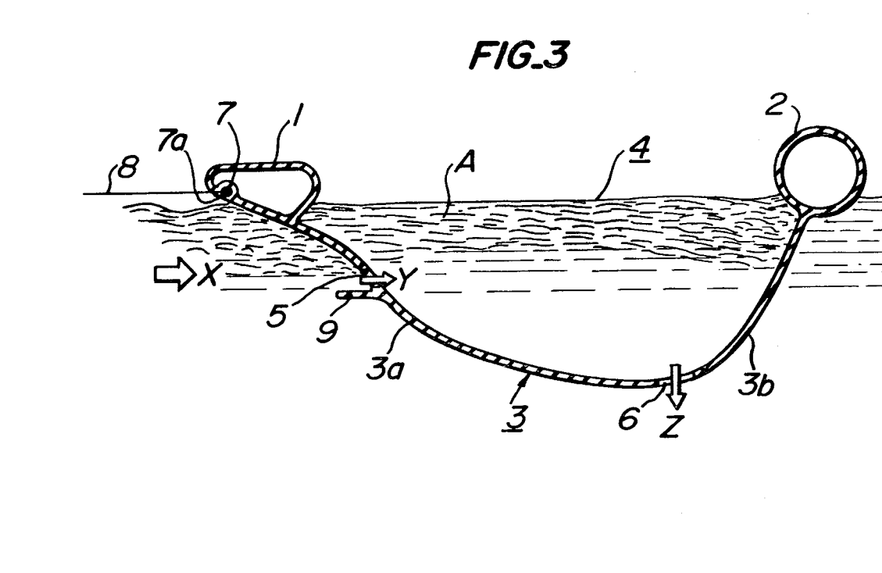
FIG. 3 is a longitudinal cross-sectional view of a modified form of the oil boom shown in FIG. 1.

In a modified embodiment shown in FIG. 3, the tension supporting member 7 is made integral with the lower front portion of the upper stream side float 1.

When the oil boom is in tow by a boat (not shown) with the aid of the rope or cable 8 connected to the tension supporting member 7 at a relative speed on the order of 1 to 2 knots for the purpose of positively collecting the floating oil slick A, the flexible base sheet 3 becomes gently curved shape as shown in FIG. 3.

That is, if the oil boom is towed by the rope or cable 8 connected to the tension supporting member 7, the water pressure in the oil collecting region 4 becomes high, so that the rear portion 3b of the flexible base sheet 3 is raised. But, any other portions of the flexible base sheet 3 except such raised rear portion 3b reveal a stream line shape with respect to the direction X of the tide flow. In other words, the front portion 3a of the flexible base sheet 3 is inclined at a small angle with respect to the direction X of the current flow, while the rear portion 3b thereof is inclined at a large angle with respect to the direction X of the current flow. As a result, it is preferable to arrange the outlet openings 6 at the deepest position of the flexible base sheet 3 submerged in the water.

The flexible base sheet 3 is provided at that front portion 3a which is adjacent to the lower part of the inlet openings 5 with an inflow guide plate 9 made integral with the flexible base sheet 3 and projected toward the upper stream side in a direction in parallel with the water surface. The inflow guide plate 9 occupies its desired position which is in parallel with the water surface when the oil boom as a whole is supported by the tension supporting member 7 and serves to guide the surface layer of water flow containing the floating oil slick A so as to introduce it through the inlet openings 5 provided in the flexible base sheet 3 into the oil collecting region 4. But, an excessive amount of the surface layer of water flow introduced into the oil collecting region 4 tends to produce a turbulent current therein. As a result, it is preferable to make the length of the inflow guide plate 9 substantially equal to a height of the inlet openings 5 when the oil boom is used under a relative speed of water of the order of 1 to 2 knots.

The present embodiment of the oil boom according to the invention constructed as above described may be supported by means of the tension supporting member 7 in an oil slick floating region where the tide current flows at a relatively high speed or a relative speed of 1 to 2 knots which is produced when the oil boom is towed by a boat. This causes the flexible base sheet 3 to take a stream line shape with respect to its moving direction thereof thus preventing the surface layer containing the floating oil slick A from being disturbed. In addition, the inflow guide plate 9 is projected toward the upper stream side in a direction in parallel with the water surface, so that the surface layer flow containing the floating oil slick A is at first directed to the lower part of the upper stream side float 1 and then moved along the upper surface of the inflow guide plate 9 and passed through the inlet openings 5 provided in the flexible base sheet 3 in a direction shown by an arrow Y and finally positively introduced into the oil collecting region 4.

Since the front portion 3a of the oil collecting region 4 is inclined downwardly with respect to the direction of the current flow shown by the arrow X, the speed of the surface layer flow thus introduced into the oil collecting region 4 is retarded so as to be flown slowly, thereby remaining the floating oil slick A in the upper layer portion of the oil collecting region 4.

In addition, since the total opening area of the outlet openings 6 provided at the lower position of the rear portion 3b of the flexible base sheet 3 per unit length thereof is made larger than that of the inlet openings 5, there is no risk of the turbulent current being produced in the case of collecting the floating oil slick A and only the sea water in the surface layer flow separated from the floating oil slick A is discharged from the oil collecting region 4 through the outlet openings 5 in a direction shown by an arrow Z.

The floating oil slick A collected in the oil collecting region 4 may effectively be sucked and collected, for example, by a collecting pump (not shown) provided in the rear of the lower stream side float 2 of the oil boom.

As stated hereinbefore, the oil boom according to the invention can prevent the floating oil slick A from becoming diffused, can positively collect the floating oil slick A into the oil collecting region 4 in a continuous and efficient manner under such conditions that the tide current flows at a speed on the order of 1 to 2 knots or at a relative speed which is produced when the oil boom is tugged by a boat.

Figure 4:
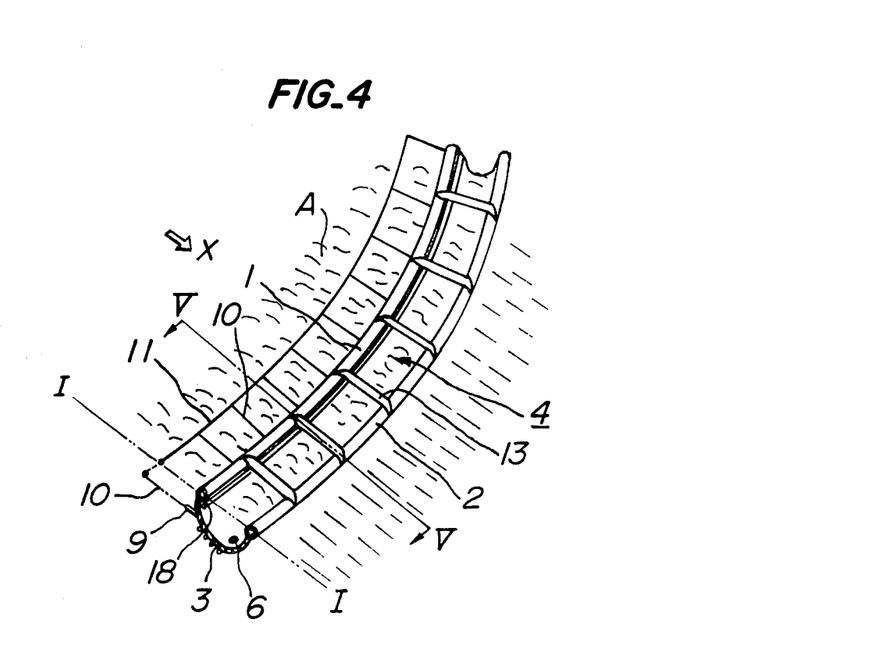
FIG. 4 is a plan view of another embodiment of the oil boom according to the invention, partly in section along a line I—I.
Figure 5:
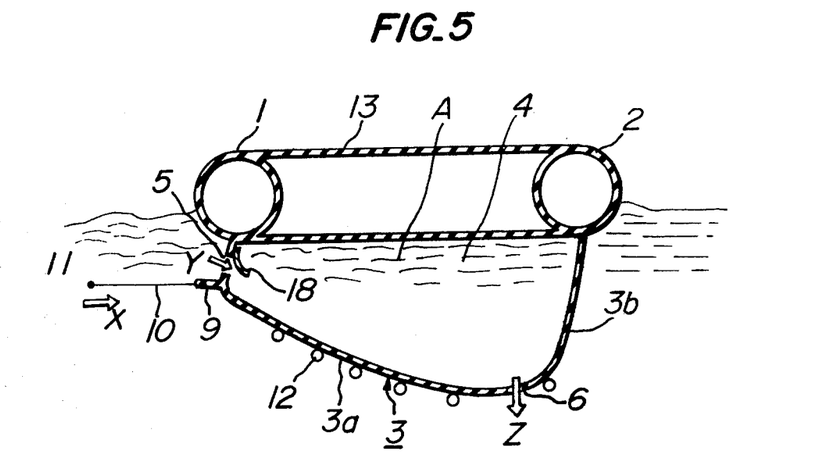
FIG. 5 is a cross-sectional view taken on line V—V of FIG. 4 in an enlarged scale.

In FIGS. 4 and 5 is shown another embodiment of the oil boom according to the invention. In the present embodiment, the upper and lower stream side floats 1, 2 are connected with each other by means of a number of connection bodies 13 equally spaced apart from each other in the lengthwise direction of the floats 1, 2. These connection bodies 13 serve to prevent the two rows of floats 1, 2 from being subjected to oscillations when the waves are high. Each of the connection bodies 13 are composed of a hermetically sealed annular tubing containing a reinforcing layer and having a proper hardness when the connection body 13 is inflated.

In the present embodiment, in order to maintain the curved shape of the flexible base sheet 3 even when the waves are high, to the exterior surface of the flexible base sheet 3 are secured a plurality of weights 12 properly spaced apart from each other in a widthwise direction of the flexible base sheet 3. The weight 12 may be composed of a chain extending in a lengthwise direction of the flexible base sheet 3 or reinforcing members such as ribs, etc. spaced apart from each other in a lengthwise direction of the flexible base sheet 3 and extending in a direction of the flow of water.

In FIGS. 4 and 5, reference numeral 18 designates an anticounterflow plate located above the inlet openings 5 and secured at its upper end to the lower portion of the upper stream side float 1. The anticounterflow plate 18 is normally closed and serves to prevent the oil slick collected in the oil collecting region 4 from escaping therefrom through the inlet openings 5 when the flexible base sheet 3 or the lower stream side float 2 becomes resonant with the movement of the waves. In the present embodiment, the anticounterflow plate 18 is composed of an elongate flexible sheet. In addition, provision is made of a tension rope 11 arranged in front of the upper stream side float 1 and extending in parallel with the lengthwise direction thereof. The tension rope 11 is connected to the upper stream side float 1 by means of a plurality of guide ropes 10 which are spaced apart from each other along the lengthwise direction of the upper stream side float 1. These guide ropes 10 supported by both the tension rope 11 and the upper stream side float 1 make it possible to hold the inflow guide plate 9 in its horizontal position, and as a result, the surface layer flow containing the floating oil slick A can positively be introduced through the inlet openings 5 provided in the flexible base sheet 3 into the oil collecting region 4.

The present embodiment of the oil boom constructed as above described can be supported by means of the tension rope 11 in an oil floating region where the tide current flows at a relatively high speed of the order of 1 to 2 knots and waves are high or at a relative speed of 1 to 2 knots which is produced when the oil boom is towed by a boat. This causes the flexible base sheet 3 to take a streamline shape with respect to its moving direction. In addition, even when the waves are high, the two rows of upper and lower stream side floats 1, 2 can be held apart from each other by a proper distance by means of the connection bodies 13. Since weights 12, etc. embedded in or secured to proper positions of the interior or exterior surface of the flexible base sheet 4 serve to forcedly suspend it in its proper upright position in the water, there is no risk of the flexible base sheet 3 fluttering by the relative oscillations of the two rows of upper and lower stream side floats 1, 2. That is, even when the flexible base sheet 3 is used under the conditions that the tide water tidal current flows at a relative speed of 1 to 2 knots and the waves are high, the flexible base sheet 3 can maintain its desired curved shape. As a result, the turbulent current is not produced in the oil collecting region 4 even when the two rows of upper and lower stream side floats 1, 2 and the flexible base sheet 4 are oscillated.

In addition, the tension rope 11 secured through the guide ropes 10 to the inflow guide plate 9 causes the inflow guide plate 9 to project in a horizontal direction in parallel with the water surface, so that the surface layer flow containing the floating oil slick A is at first directed to the lower part of the upper stream side float 1 and then moved along the upper surface of the inflow guide plate 9 and passed through the inlet openings 5 provided in the flexible base sheet 3 in a direction shown by the arrow Y, the anticounterflow plate 18 being forced to be opened by the water pressure, and finally positively introduced into the oil collecting region 4.

Since the front portion of the oil collecting region 4 is inclined downwardly with respect to the direction of the tide current flow shown by the arrow X, the speed of the surface layer flow thus introduced into the oil collecting region 4 is retarded so as to flow slowly, thereby retaining the floating oil slick A in the upper layer portion of the oil collecting region 4.

In addition, since the total opening area of the outlet openings 6 provided at the lower position of the rear portion 3b of the flexible base sheet 3 per unit length thereof is made larger than that of the inlet openings 5, there is no risk of the turbulent current being produced in the case of collecting the floating oil slick A and only the sea water in the surface layer flow separated from the floating oil slick A is discharged from the oil collecting region 4 through the outlet openings 6 in a direction shown by an arrow Z.

In the present embodiment, the anticounterflow plate 8 provided above the inlet openings 5 serves to prevent the floating oil slick A which has been collected in the oil collecting region 4 from being discharged therefrom through the inlet openings 5. As a result, the present embodiment plays a role of completely collecting the floating oil slick A even when the waves are high.

Figure 6:
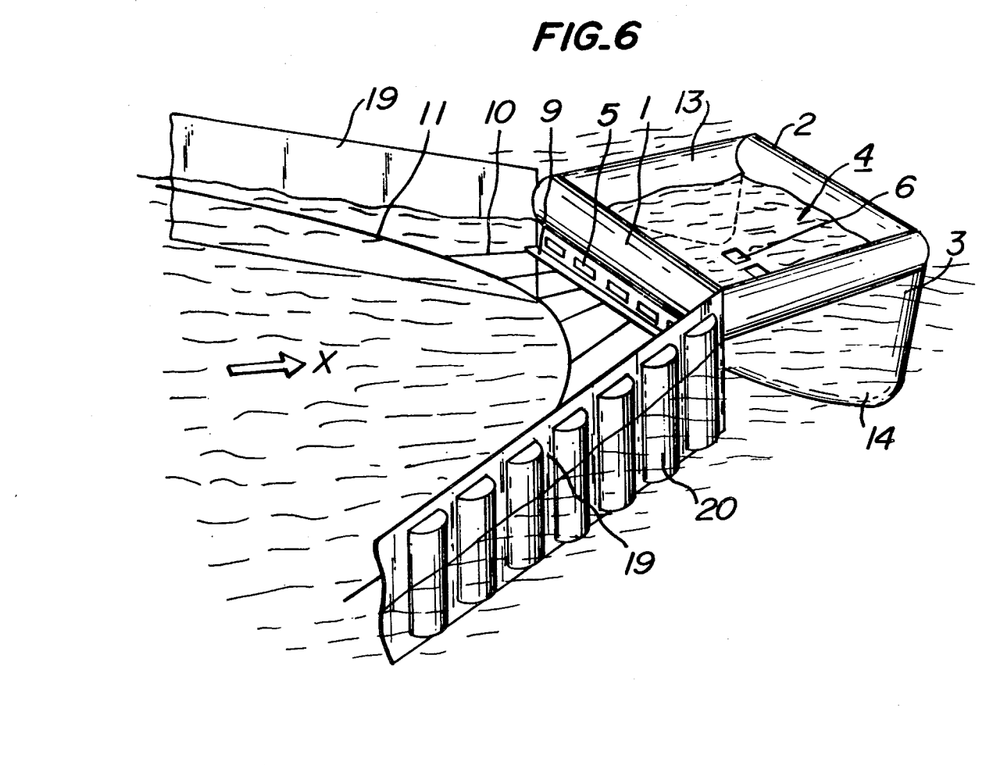
FIG. 6 is a perspective view of a further embodiment of the oil boom according to the invention.

In FIG. 6 is shown a further embodiment of the oil boom according to the invention. In the present embodiment, to both ends of the upper stream side float 1 are secured rear ends of a pair of guide fences 19, 19, the front free ends of which diverge and are adapted to be towed by a pair of boats (not shown). Each the guide fences 19 is composed of a flexible rubber sheet and provided at its outer side surface with a plurality of semicircular cylinder-shaped vertical floats 20 which are spaced apart from each other. The tension rope 11 connected through the connection bodies 10 to the inflow guide plate 9 is so arranged as to make its front free ends in parallel with the guide fences 19, 19. Thus, it is possible to tow the oil boom 1, 2 with the aid of both the tension rope 11 and the guide fences 19, 19 and hence prevent the latter from being subjected to excessively large tension.

In the present embodiment, the tension rope 11 connected through the connection bodies 10 to the inflow guide plate 9 also serves to maintain the upper stream side float 1 in its proper upright position in the tide flow X containing the floating oil slick. In addition, the inflow guide plate 9 is projected in a horizontal direction in parallel with the water surface. As a result, the floating oil slick can positively and reliably be introduced into the oil collecting region 4.

In the present embodiment, the oil collecting region 4 is formed by one of these regions separated from each other by the connection bodies 13, 13. Such oil collecting region 4 is hermetically sealed by a flexible side surface sheet 14 connected to both the lower portions of the connection floats 13, 13 and the flexible base sheet 3. It is preferable to form a skirt of the guide fence 19 by an extension of the flexible side surface sheet 14.

Figure 7:
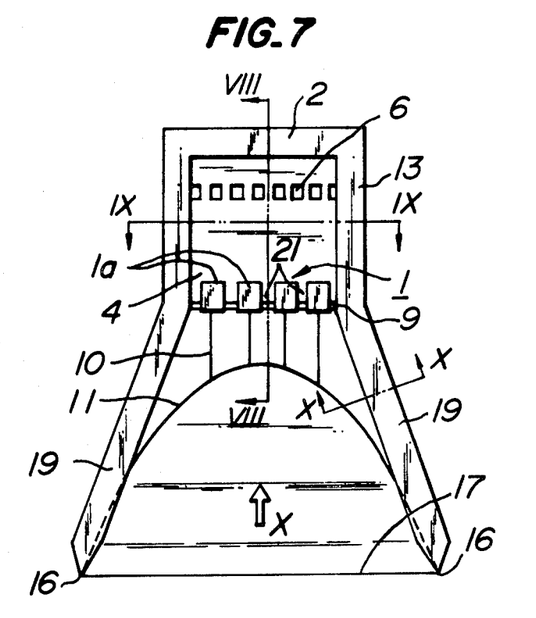
FIG. 7 is a plan view of a still further embodiment of the oil boom according to the invention.
Figure 8:
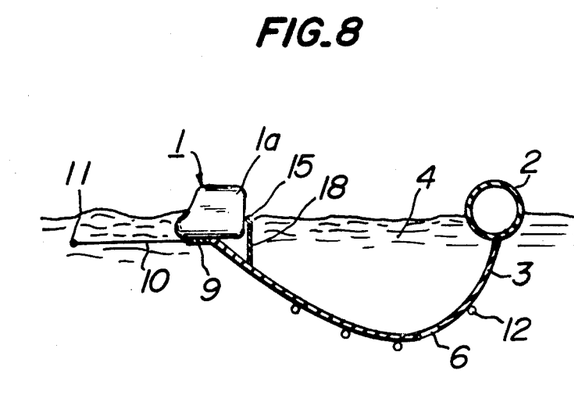
FIG. 8 is a cross-sectional view taken on line VIII—VIII of FIG. 7.
Figure 9:
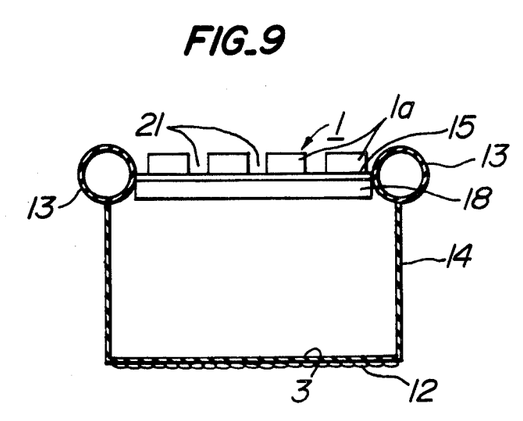
FIG. 9 is a cross-sectional view taken on line IX—IX of FIG. 7.

In FIG. 7 is shown a still further embodiment of the oil boom according to the invention. In the present embodiment, each given lengths of guide fences 19, 19 is a tubing made integral with the connection body 13 and diverges toward the front and the anticounterflow plate 18 is secured at its lower end to the flexible base sheet 3. As shown in FIG. 8 it is maintained in its upright position by means of a float 15 provided at the upper end of the anticounterflow plate 18.

Figure 10:
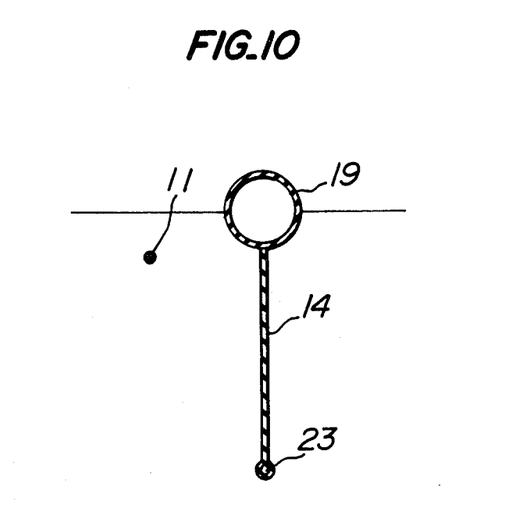
FIG. 10 is a cross-sectional view taken on line X—X of FIG. 7.

Both the guide fences 19, 19 communicate with the connection bodies 13 and the lower stream side float 2 as shown in FIG. 7, so that these tubings can be inflated and deflated in a simple manner. If these tubings are deflated when the oil boom is not used, it is possible to make the oil boom compact in construction and small in size. It is preferable to make the flexible side surface sheet 14 integral with the skirt 14 of the guide fence 19 which is provided at its lower end with a weight 22 as shown in FIG. 10.

In the present embodiment, the upper stream side float 1 is composed of a plurality of floats 1a separated from each other by a gap 21. As shown in FIG. 8, it is preferable to form each these floats such that its lower submerged portion is projected therefrom in a direction opposed to the water flow for the purpose of preventing the floating oil slick from being submerged into the water.

In the present embodiment, to the lower end of the float 1a is secured the inflow guide plate 9. The anticounterflow plate 18 is composed of a thin flexible sheet.

As described above, since the upper stream float 1 is composed of a plurality of floats 1a equally spaced apart from each other, the sea water containing the floating oil slick causes the anticounterflow plate 18 to push down even when the floating oil slick flows at a very low relative speed and is flown into the oil collecting region 4. Even when the relative speed is high and the waves are high, the sea water containing the oil slick passes through the gap 21 between the two adjacent tubings 1a, 1a and causes the anticounterflow plate 18 to push down and is introduced into the oil collecting region 4. The gap 21 between the two adjacent floats 1a, 1a corresponds to the inlet opening 5 in the previous embodiments, so that it is preferable to make the total opening area of the gaps 21 per unit length of the flexible base sheet 3 which are submerged in the water about one half the total opening area of the outlet openings 6 provided in the flexible base sheet 3.

In other words, the total opening area measured along the lengthwise direction of the gaps 21 which corresponds to that of the inlet openings 5 provided in the flexible base sheet 3 has a given optimum value, so that if the width of the float 1a is larger than the gap 21, the inflow guide plate 9 may deeply be submerged into the water. As a result, there is no risk of the inflow guide plate 9 being exposed on the water surface even when the waves are high, thereby positively introducing the oil slick into the oil collecting region 4.

Alternatively, if the gap 21 between the two adjacent floats 1a, 1a of the upper stream side float 1 is made very narrow, the inlet opening 5 becomes very small to increase frictional resistance of the water against the floats 1a. As a result, the inlet opening 5 per se functions in retarding the speed of the water.

In the present embodiment, both ends of the tension rope 11 are firmly secured to a joint 16 provided in each the front ends of the guide fences 19, 19. It is preferable to make the distance between the two opposed joints 16, 16 about two times longer than the length of the upper stream side float 1. For this purpose, use is made of a rope 17 having a length which is about two times longer than the length of the upper stream side float 1 so as to connect the opposed joints 16, 16 with each other through the rope 17.

What is claimed is:

1. An oil boom for damming and collecting a floating oil slick comprising two rows of floats spaced apart from each other and partly submerged in water, one row being disposed upstream of the other row, a flexible base sheet connected across base portions of said two rows of floats and hanging down therefrom below into the water in a curved shape, a plurality of inlet openings arranged near said upper stream side float and extending in its lengthwise direction, an inflow guide plate integral with said flexible base sheet and arranged below said inlet openings, said inflow guide plate projecting up-stream in a direction in parallel with the water surface, and a plurality of outlet openings arranged in a rear portion of said flexible base sheet and extending in its lengthwise direction, the total opening area of said outlet openings per unit length of said flexible base sheet in its lengthwise direction being larger than that of the inlet openings.

2. An oil boom according to claim 1 comprising further at least two connection bodies for connecting said two rows of floats, each said connection bodies having a finite length and a proper hardness.

3. An oil boom according to claim 1 further comprising an anticounterflow plate located at up-stream from a position intermediate between said upstream and downstream floats and extending along a lengthwise direction of said up-stream float, said anticounterflow plate being composed of an elongate flexible sheet normally closing said inlet openings.

4. An oil boom according to claim 1 comprising further a tension rope located in front of said inflow guide plate and extending in a lengthwise direction of said inflow guide plate, said tension rope being connected through a plurality of guide ropes to said inflow guide plate, said guide ropes being spaced apart from each other.

5. An oil boom according to claim 1 wherein a ratio of the total opening area of said outlet openings per unit length of said flexible base sheet in its lengthwise direction to that of said inlet openings is selected to the order of approximately 2.

6. An oil boom according to claim 1 wherein said flexible base sheet is provided at that portion thereof which is located below said upstream float with a tension supporting member.

7. An oil boom according to claim 6 wherein said tension supporting member is connected a with towing means to a boat.

8. An oil boom according to claim 1 wherein said outlet openings are located at the deepest submerged portion of said flexible base sheet in the water.

9. An oil boom according to claim 1 wherein said inflow guide plate has a length which is substantially equal to a height of said inlet opening.

10. An oil boom according to claim 2 wherein each said connection bodies is composed of a hermetically sealed annular tubing containing a reinforcing layer and having a proper hardness when said connection body is inflated.

11. An oil boom according to claim 1 wherein said flexible base sheet is provided with a plurality of weights spaced apart from each other in a widthwise direction thereof.

12. An oil boom according to claim 11 wherein said weight is composed of a chain extending in a lengthwise direction of said flexible base sheet.

13. An oil boom according to claim 11 wherein said weight is composed of a rib extending in a direction of the flow of water.

14. An oil boom according to claim 2 wherein said two rows of floats are connected by two connection bodies and are provided at both sides with a flexible side surface sheet and at both ends with two guide fences diverged toward the upper stream side.

15. An oil boom according to claim 14 wherein said upstream float is composed of a plurality of floats separated from each other by a gap and secured to said inflow guide plate.

* * * * *